(12) United States Patent
Flint et al.

(10) Patent No.: US 8,171,403 B2
(45) Date of Patent: May 1, 2012

(54) SYSTEM AND METHOD FOR MANAGING ACRONYM EXPANSIONS

(75) Inventors: Erika C Flint, Los Gatos, CA (US); Jeffrey Alan Kusnitz, Campbell, CA (US)

(73) Assignee: International Business Machines Corporation, Armonk, NY (US)

( * ) Notice: Subject to any disclaimer, the term of this patent is extended or adjusted under 35 U.S.C. 154(b) by 434 days.

(21) Appl. No.: 12/545,045

(22) Filed: Aug. 20, 2009

(65) Prior Publication Data

US 2011/0047457 A1 Feb. 24, 2011

(51) Int. Cl.
*G06F 17/00* (2006.01)

(52) U.S. Cl. ........................................ 715/261

(58) Field of Classification Search .................. 715/255, 715/256, 260, 261
See application file for complete search history.

(56) References Cited

U.S. PATENT DOCUMENTS

| | | | |
|---|---|---|---|
| 6,385,629 B1 | 5/2002 | Sundaresan et al. | |
| 6,411,932 B1* | 6/2002 | Molnar et al. | 704/260 |
| 6,966,030 B2 | 11/2005 | Ashford et al. | |
| 7,236,923 B1 | 6/2007 | Gupta | |
| 7,860,706 B2* | 12/2010 | Abir | 704/4 |
| 2002/0040359 A1* | 4/2002 | Green et al. | 707/3 |
| 2002/0156774 A1* | 10/2002 | Beauregard et al. | 707/3 |
| 2005/0114130 A1* | 5/2005 | Java et al. | 704/240 |
| 2005/0160065 A1* | 7/2005 | Seeman | 707/1 |
| 2007/0067280 A1* | 3/2007 | Zhou et al. | 707/5 |
| 2007/0162445 A1 | 7/2007 | Scriffignano | |
| 2007/0174045 A1 | 7/2007 | Kao | |
| 2007/0208734 A1* | 9/2007 | Koide et al. | 707/5 |
| 2007/0208755 A1* | 9/2007 | Bhatkar et al. | 707/10 |
| 2007/0250486 A1* | 10/2007 | Liao et al. | 707/3 |
| 2010/0030715 A1* | 2/2010 | Eustice et al. | 706/12 |

OTHER PUBLICATIONS

Jain, Alpa, et al, "Acronym-Expansion Recognition and Ranking on the Web", Information Reuse and Integration, 2007, IRI 2007, ISBN: 1-4244-1500-4, Sep. 4, 2007, pp. 209-214.*
Chun-Jen Lee, Jason S. Chang, and Jyh-Shing Jang, Alignment of Bilingual Named Entities in Parallel Corpora Using Statistical Models and Multiple Knowledge Sources, article, Jun. 2006, ACM Transactions on Asian Language Information Processing, vol. 5, No. 2, pp. 121-145, to the best of the applicants knowledge this document was published in the United States by Publications Dept., ACM, Inc., 2 Penn Plaza, New York, NY 10121, United States.

* cited by examiner

*Primary Examiner* — Laurie Ries

(57) ABSTRACT

Systems and methods for managing acronym expansions are described. In one example, the method comprises creating from the plurality of identified expansions a case-insensitive group of identified expansions, wherein each identified expansion of the case-insensitive group match in a case-insensitive manner the other identified expansions of the case-insensitive group. The method also comprises assigning a weight to the text source location for each identified expansion in the case-insensitive group. The method further comprises creating from the case-insensitive group at least one case-sensitive group of identified expansions, wherein each identified expansion of the case-sensitive group of identified expansions match in a case-sensitive manner the other identified expansions of the group of case-sensitive identified expansions. The method also comprises for each case-sensitive group of identified expansions, determining from the weights of the text source locations for the identified expansions a total weight. The method further comprises comparing the total weights for the at least one group of case-sensitive identified expansions. The method also comprises selecting a first group of case-sensitive identified expansions from the at least one group of case-sensitive identified expansions upon comparing the total weights. The method further comprises associating an identified expansion corresponding to the first case-sensitive group of identified expansions to the potential acronym.

20 Claims, 11 Drawing Sheets

| Idx | Acronym | Source | Expansion |
|-----|---------|--------|-----------|
| 1 | WCS | W3 | World Computer System |
| 2 | WCS | Blog | WORLD COMPUTER SYSTEM |
| 3 | WCS | Blog | World Computer System |
| 4 | WCS | Blog | world computer system |
| 5 | WCS | W3 | World Computer System |

Figure 4

| Acronym: Upper Case Expansion | Idx | Source | Expansion | Orig |
|---|---|---|---|---|
| WCS: WORLD COMPUTER SYSTEM | 1 | W3 | World Computer System | 1 |
| | 2 | Blog | WORLD COMPUTER SYSTEM | 2 |
| | 3 | Blog | World Computer System | 3 |
| | 4 | Blog | world computer systems | 4 |
| | 5 | W3 | World Computer System | 5 |

Figure 5

| Expansion | Score |
|---|---|
| World Computer System | 1.25 |

Figure 6A

| Expansion | Score |
|---|---|
| World Computer System | 1.25 |
| WORLD COMPUTER SYSTEM | 0.5 |

Figure 6B

| Expansion | Score |
|---|---|
| World Computer System | 1.75 |
| WORLD COMPUTER SYSTEM | 0.5 |

Figure 6C

| Expansion | Score |
|---|---|
| World Computer System | 1.75 |
| WORLD COMPUTER SYSTEM | 0.5 |
| world computer system | 0.5 |

Figure 6D

| Expansion | Score |
|---|---|
| World Computer System | 3.00 |
| WORLD COMPUTER SYSTEM | 0.5 |
| world computer system | 0.5 |

Figure 6E

SYSTEM AND METHOD FOR MANAGING ACRONYM EXPANSIONS

FIELD OF THE INVENTION

Embodiments of the disclosure relate generally to the field of data processing systems. For example, embodiments of the disclosure relate to systems, methods and computer programs for managing the expansions of acronyms.

BACKGROUND

The term "acronym" as the name for a word (such as SONAR) created from the first letter or letters of each word in a series of words (such as SOund Navigation And Ranging) is believed to have first appeared in 1943. Thus, the term "acronym" is widely used to describe any abbreviation formed by using initial letters. Particularly with governmental or other large organizations, acronyms tend to be prevalent. Often, there is no central database that defines the meanings, also known as the "expansion," of these acronyms. For example, the "expansion" of "SONAR" is "SOund Navigation and Ranging." Thus, there is a need for a process for determining the expansion of acronyms.

Acronyms are widely used in webpages, books, text and many other types of documents. Examples of text programs include electronic books, text editor programs, a browser, a word processor, or any other program that displays or manages text.

SUMMARY

Methods, systems and computer programs for managing acronym expansions are described. In one embodiment, the method comprises creating from the plurality of identified expansions a case-insensitive group of identified expansions, wherein each identified expansion of the case-insensitive group match in a case-insensitive manner the other identified expansions of the case-insensitive group. The method also comprises assigning a weight to the text source location for each identified expansion in the case-insensitive group. The method further comprises creating from the case-insensitive group at least one case-sensitive group of identified expansions, wherein each identified expansion of the case-sensitive group of identified expansions match in a case-sensitive manner the other identified expansions of the group of case-sensitive identified expansions. The method also comprises for each case-sensitive group of identified expansions, determining from the weights of the text source locations for the identified expansions a total weight. The method further comprises comparing the total weights for the at least one group of case-sensitive identified expansions. The method also comprises selecting a first group of case-sensitive identified expansions from the at least one group of case-sensitive identified expansions upon comparing the total weights. The method further comprises associating an identified expansion corresponding to the first case-sensitive group of identified expansions to the potential acronym.

This illustrative embodiment is mentioned not to limit or define the invention, but to provide examples to aid understanding thereof. Illustrative embodiments are discussed in the Detailed Description, and further description of the disclosure is provided there. Advantages offered by various embodiments of this disclosure may be further understood by examining this specification.

BRIEF DESCRIPTION OF THE DRAWINGS

These and other features, aspects, and advantages of the present invention are better understood when the following Detailed Description is read with reference to the accompanying drawings, wherein:

FIG. 4 is an example of an acronym-array table used to collect the expansions of the acronym of interest during the method illustrated in FIG. 3.

FIG. 5 is an example of a completed combined hash table during the method illustrated in FIG. 3.

FIG. 6 illustrates an example of how a temporary hash table searches, using a summarization and selection process of the method illustrated in FIG. 3, to determine the preferred expansion for the acronym of interest.

DETAILED DESCRIPTION OF PREFERRED EMBODIMENTS

Embodiments of the disclosure relate generally to the field of data processing systems. For example, embodiments of the disclosure relate to systems, methods and computer programs for determining the meaning of an acronym are disclosed.

Throughout the description, for the purposes of explanation, numerous specific details are set forth in order to provide a thorough understanding of the present disclosure. It will be apparent, however, to one skilled in the art that the present disclosure may be practiced without some of these specific details. In some instances, well-known structures and devices are shown in diagram form to avoid obscuring the underlying principles of the present disclosure.

With the proliferation of acronyms, a user may be unsure as to the expansion for every acronym encountered. Therefore, the system may determine and manage acronyms for users. In one example, a user may query the system for an expansion by giving the acronym for the requested expansion. The system may then respond to the request with the determined expansion for the acronym. In another embodiment, the system may automatically replace or attach to acronyms within electronic text (such as web pages, word documents, etc.) the expansion for the electronic text. Mediums for the system to determine expansions may exist as, but is not limited to, an instant messaging client or profile, standalone application, web page, Operating System widget or plug-in, or application plug-in.

Figure 1:
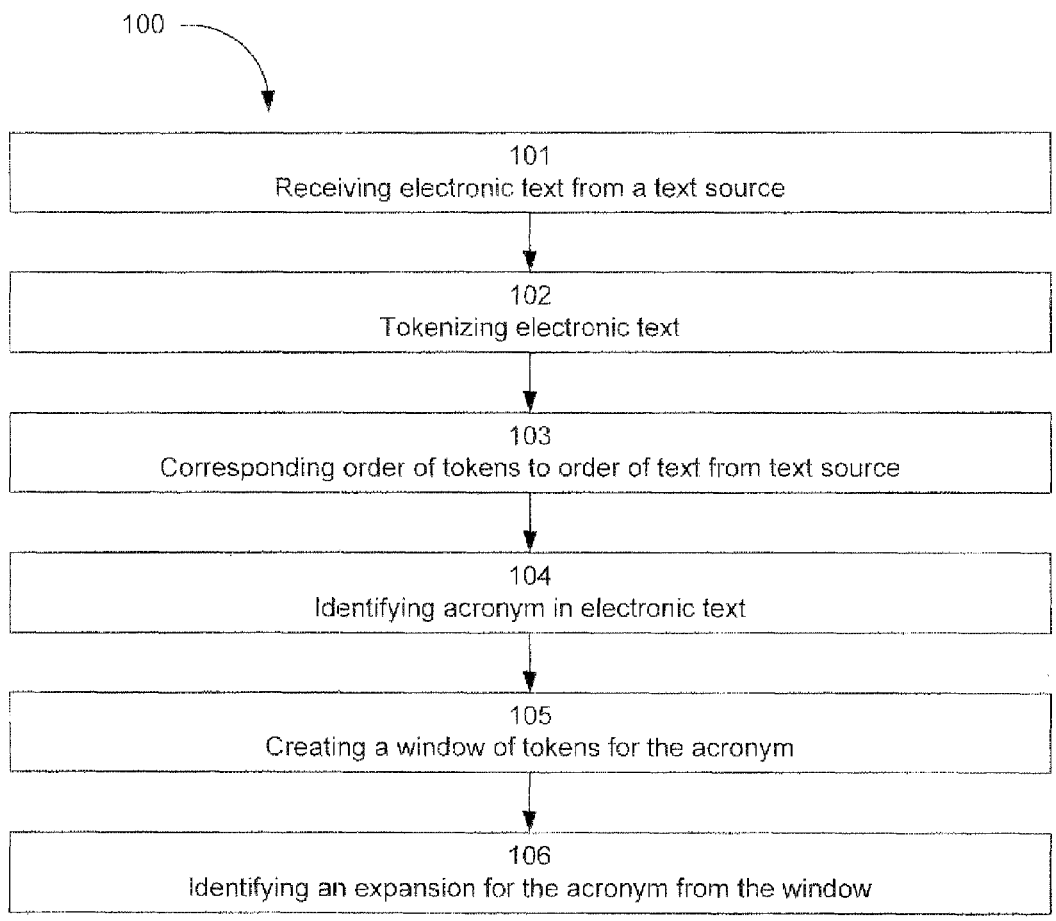
FIG. 1 is a block diagram representation illustrating a method of determining possible acronym expansions for acronyms in an electronic text.

FIG. 1 is a block diagram 100, which shows an example method of determining possible acronym expansions for acronyms in an electronic text. In one embodiment, beginning at 100, an electronic text is received from a text source. Text sources may include, but are not limited to web pages, instant messaging chat logs, and electronic documents, presentations, spreadsheets, or projects. To receive the electronic text, in one embodiment, internet pages are crawled.

Proceeding to 102, the electronic text is tokenized. For example, each word is determined as a token. In 103, the order of the tokens is corresponded with the order of words in the text source. Thus, when the tokens are streamed, they are streamed in the same order as the words appear in the electronic text.

Proceeding to 104, an acronym is identified in the electronic text. In one embodiment of identifying an acronym, a token may be identified as an acronym if the token is a word in all capitalized letters (e.g., CD, DVD) or encapsulated in parenthesis. In addition to identifying an acronym, the index of the acronym in the electronic text is determined. The index identifies where the identified acronym is located in the electronic text.

Upon identifying an acronym in the electronic text, a window of tokens is created for the identified acronym in 105. In one embodiment, the window consists of a predetermined number of tokens located directly before and after the acronym in the stream of tokens. In other embodiments, the window may consist of tokens directly before or directly after the acronym. In another embodiment, the predetermined number is identified by a user for each acronym or electronic text being processed. In another embodiment, the predetermined number may be dependent on the length of the identified acronym. In one embodiment, the size of the window may be reduced if the acronym is encapsulated by parenthesis. For example, the size of the window may be reduced to twice the length of the acronym (i.e., the number of characters in the acronym) plus one number of tokens. In reducing the size of the window, less information is processed, thus increasing the speed of determining an expansion for an acronym.

Proceeding to 106, an expansion for the acronym is identified in the window of tokens. The identification of an expansion may be limited to within the window since the author will typically define an acronym within the vicinity of stating the acronym (e.g., "Compact Disk (CD)"). In one embodiment, an expansion may be determined in the following manner.

Determining an Expansion for an Acronym Within the Window

In one embodiment, reading from left to right the letters of the acronym and the tokens in the window, the letters of the acronym are attempted to be matched with the letters of the tokens within the window. Therefore, each letter of the acronym should correspond to a unique letter of a token in the window. In the simplest example, each letter of the acronym corresponds to a separate token in the window.

In another embodiment, tokens are processed in the order of closest to the acronym to farthest away from the acronym (inside out). Thus, tokens to the right of the acronym are processed from left to right (with the letters of the acronym being processed from left to right). Tokens to the left of the acronym are processed from right to left (with the letters of the acronym being processed from right to left). The following example describes processing tokens from left to right, but it is apparent to one skilled in the art that how to process tokens from right to left as described.

First, the first letter of the acronym is matched. In one embodiment, the first letter of each token from left to right in the window are compared to the first letter of the acronym until the first letter of the acronym matches a first letter of a token. Upon matching the first letter of a token to the first letter of the acronym, the system determines if the subsequent letters of the acronym match the subsequent letters of the token. For example, referring to the acronym SONAR, the system would first match the S, then match the O in Sound and SONAR after matching the S. After creating all possible matches to the subsequent letters in the token, the system proceeds to identify a token for the next unmatched letter in the acronym.

Some acronyms include a letter that represents a letter within the middle of a token word. For example, the acronym SW stands for software. Therefore, the system further determines if the next unmatched letter matches any letter of the last matched token. In one embodiment, the system attempts to determine the first letter of each syllable in the token. The system then matches the first letter of the syllables to the letter of the acronym.

In matching subsequent letters of an acronym to subsequent tokens, intermediary words may exist between tokens to match to subsequent letters of an acronym. For example, USA stands for United States of America, wherein "of" is an intermediary word between token States matching S in USA and token America matching A in USA. Example intermediary words include, but are not limited to, a, an, of, for, with, and, by, and from. In one embodiment, if the token subsequent to the last matched token does not match to the next letter of the acronym, the system determines if the unmatched token is an intermediary word. If the token is an intermediary word, the system attempts to match the next token to the unmatched letter in the acronym. In one embodiment, the list of intermediary words may be a stored list of words or determined by the user.

Furthermore in determining the expansion for an acronym from the window of tokens, if the letter of the acronym is an 'x' and does not match the first letter of the tokens, the system may determine if the 'x' matches the second letter of the token. For example, AIX stands for Advanced Interactive Executive. Thus, after matching A to Advanced and I to Interactive, the system in matching the X would compare the second letter of Executive ('x') in order to match the token Executive to the letter X in the acronym. In one embodiment, the system searches for 'ex' to replace x, wherein 'ex' would be considered equal to the letter x. Thus, in the previous example, the system would read the first letter of Executive to be 'ex' when attempting to match X from AIX.

During the determination of the expansion, matching of letters may be case sensitive or case insensitive. In one embodiment, a user may determine which search should take place. In another embodiment, a case sensitive matching is performed. If no expansion can be determined from the window, then a case insensitive search may be performed.

Example System and Method for Managing Expansion

In determining expansions, multiple different expansions may be identified for the same acronym. For example, SW may be identified as Software, South West, and Selected Workstation. Therefore, the system may manage the multiple expansions in order to suggest an expansion and/or rank the expansions for the user to help determine the intended/preferred expansion for the acronym.

Figure 2:
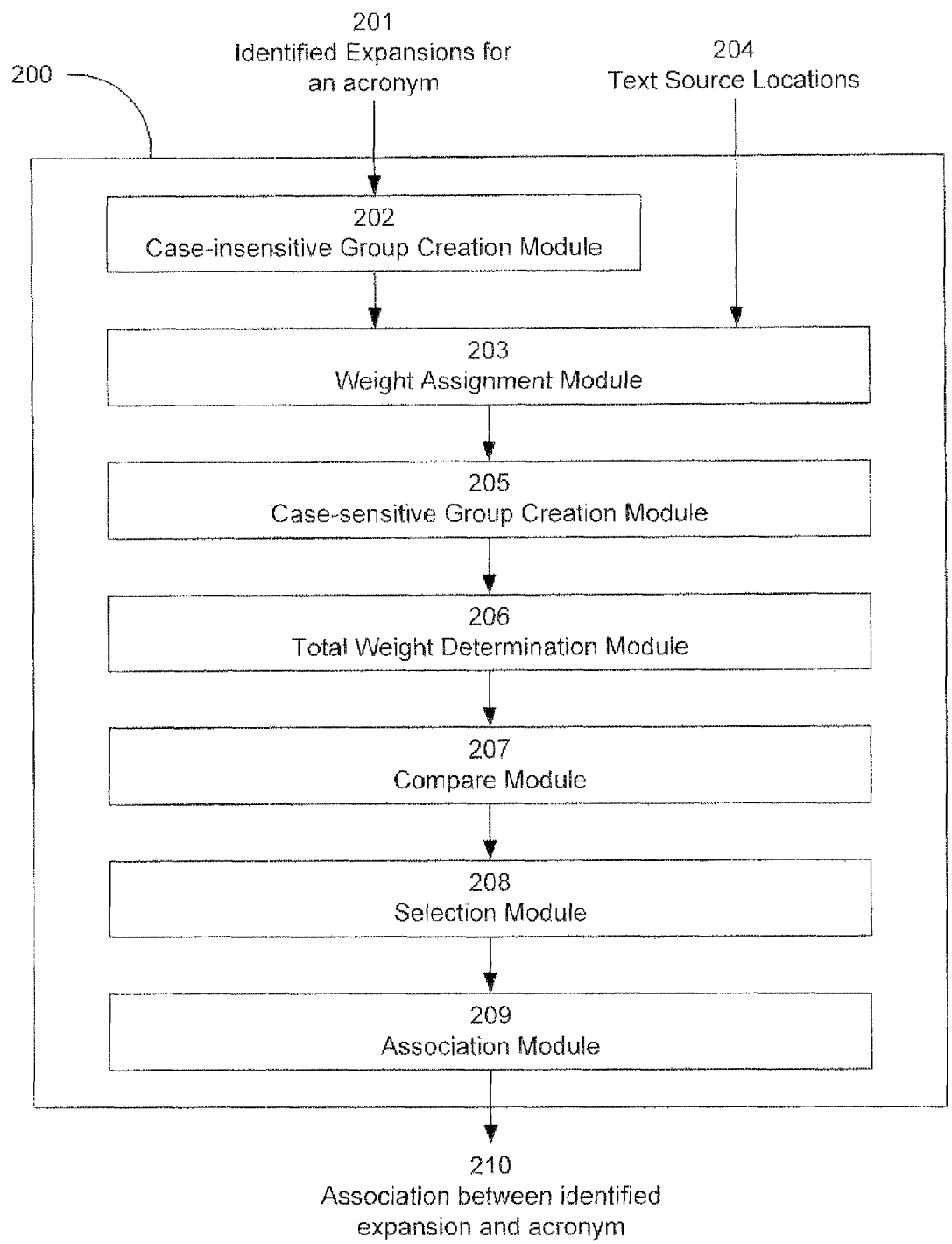
FIG. 2 illustrates an example system for organizing a plurality of identified expansions for a potential acronym.

FIG. 2 is a diagram illustrating an example system 200 for organizing a plurality of identified expansions for a potential acronym in order to determine a preferred expansion for each acronym. The system 200 receives identified expansions 201 and text source locations 204 for the acronyms/expansions. The system 200 outputs an association between the expansion and acronym, which may include information about the associations strength (e.g., how many times the expansion was identified, importance of documents including the acronym, etc.). The system 200 generally comprises the following modules to compute and output the association 210: a case-insensitive group creation module 202, a weight assignment module 203, a case-sensitive group creation module 205, a total weight determination module 206, a compare module 207, a selection module 208, and an association module 209.

Figure 3:
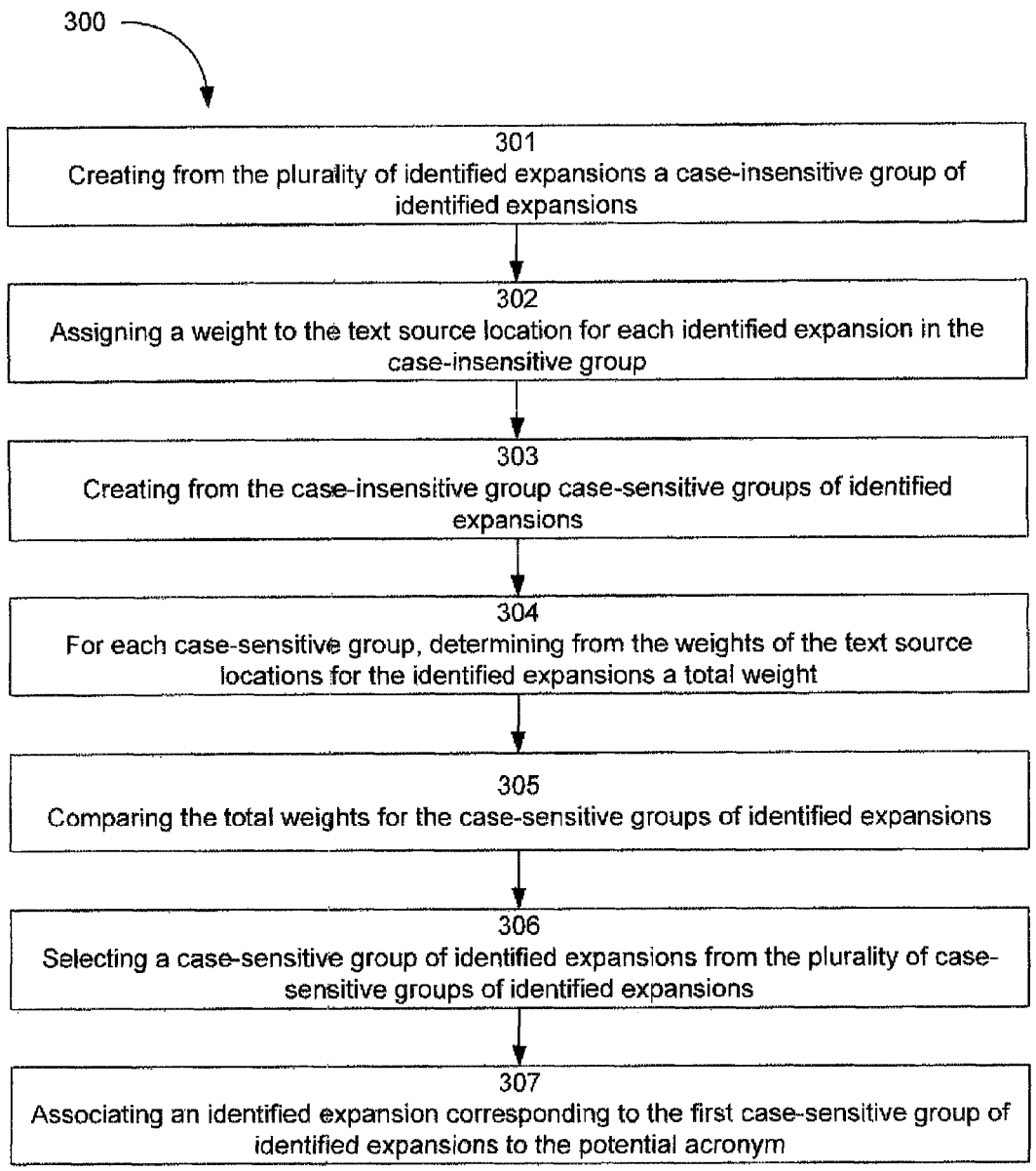
FIG. 3 is a block diagram representation illustrating a method of organizing a plurality of identified expansions for a potential acronym by the example system illustrated in FIG. 2.

FIG. 3 is a block diagram, which shows an example method 300 of determining a preferred expansion for an acronym in the electronic text from the possible acronym expansions determined by the method illustrated in FIG. 1. Beginning at 301, upon the case-insensitive group creation module 202 of the system 200 receiving the identified expansions for an acronym, the case-insensitive group creation module 202 creates from the plurality of identified expansion 201 a case-insensitive group of identified expansions. Thus, expansions within the group correspond irrespective of capitalization (e.g., software matches SOFTWARE).

Proceeding to 302, the weight assignment module 203 of the system 200 receives the text source location 204 for each expansion in the case-insensitive group of expansions and assigns a weight to each received text source location 204. Weights may be dependent on the age of the text including the expansion, the location of the text (blog, credible web page, or dubious web page, etc.). The case-sensitive group creation module 205 of system 200 then creates from the case-insensitive group case-sensitive groups of expansions in 303. Hence, expansions must match, too, in order to be in the same case-sensitive group (e.g., Software does not match software or SOFTWARE).

Proceeding to 304, for each case-sensitive group, the total weight determination module 206 of the system 200 determines from the weights of the text source locations 204 for the identified expansions in the group a total weight. For example, the weights may be summed to create a total weight for the case-sensitive group. In another embodiment, the system 200 may determine the number of expansions in the case-sensitive group.

Upon determining a total weight for each case-sensitive group, the compare module 207 of system 200 compares among each other the total weights for the case-sensitive groups of identified expansions in 305. From the comparisons, the selection module 208 then selects a case-sensitive group of identified expansions from the plurality of case-sensitive groups of identified expansions in 306. In one embodiment, the selection module 208 selects the group with the largest total weight (e.g., selecting the expansion that appeared the most in the electronic text). Proceeding to 307, the association module 209 associates to the acronym the expansion corresponding to the selected case-sensitive group of identified expansions.

As an example for identifying and managing acronyms, FIG. 4 shows an example of an acronym-array table used to collect the expansions of the acronym of interest during the method illustrated in FIG. 3. In the example shown in FIG. 4, the acronym of interest is "WCS." Of course, the embodiments of the present invention are not limited to three letter acronyms or the acronym "WCS."

As seen in FIG. 4, a user, typically using a user interface, has located an acronym that is unknown to the user. The present unknown "acronym of interest" is "WCS." Because this user or other users may have used the acronym expansion process before, the Acronym-array Table seen in FIG. 4 may already exist or may be created by the user's request to identify the likely meaning of the acronym "WCS." The acronym "WCS" is located in a text source and the text source is situated in a text source location. For example, a "text source" may be a document, web page, spreadsheet, or other item containing an acronym. For example, a "text source location" may be the Internet, an intranet, or a blog.

As seen in FIG. 4, when the user asks the process to determine the likely meaning, also referred to as the "expansion," of "WCS," the process invokes a method for identifying the presence of an acronym. After an embodiment of the present invention locates the acronym "WCS" in other locations, the process stores these other uses of "WCS" in an Acronym-array Table, as seen in FIG. 4. As can be seen in FIG. 4, it is desirable to group identical or nearly identical expansions. For example, as seen in FIG. 4, with the exception of differences in capitalization, the expansions of "WCS" are the same. For example the expansions for Idx 1 and Idx 2 are the same except that the term "World Computer System" has only the first letter of each word capitalized, in contrast, all letters of "WORLD COMPUTER SYSTEM" are capitalized. It can also be seen that Idx 3 and Idx 5 have the same expansions. Of course, this example is limited to five uses of the acronym "WCS," rather than the potentially thousands or millions of uses of the same acronym that could be found on the Internet or an intranet. For example, a search of the Internet involving the term "WCS" produced 11,700,000 hits. However, the present embodiment of the present invention is not limited by the example described in the present application. Indeed, the embodiments of the present invention are not limited to the acronym "WCS," but can also determine the likely meaning of any acronym.

FIG. 4 shows five expansions of the acronym "WCS" that are "World Computer System" or a similar expansion.

FIG. 5 shows an example of the completed combined hash table used during the method illustrated in FIG. 3. The Combined Hash Table seen in FIG. 5 is populated by a key, called a combo-key, that concatenated the acronym of interest WCS, a colon and the upper case, also referred to as capitalized, version of the acronym of interest WCS. For example, the key for Idx 1 of FIG. 4 is "WCS:WORLD COMPUTER SYSTEM". It can also be seen from FIG. 4 that the second column, Idx, contains the position of the particular source/expansion in the combo-array associated with the combo-key. The "source" indicates the source of the combo-key. For example, W3 stands for the World Wide Web.

FIG. 6 shows an example of how a temporary hash table (e.g., the hash table shown in FIG. 4) searches, using a summarization and selection process used by an embodiment of the present invention to determine the most likely expansion of the acronym "WCS." FIG. 6A shows that the process generates a temporary hash table for each expansion. As seen in FIG. 5, the first expansion summarized is Idx 1 ("World Computer System.") As seen in FIGS. 5 and 6A, this expansion was found on "W3." Web based expansions receive a weighted score of 1.25. Thus, as seen in FIG. 6A, "World Computer System," now has a score of "1.25."

This process is repeated in FIG. 6B, where the expansion "WORLD COMPUTER SYSTEM," from the Combined Hash Table in FIG. 5, is processed. As seen in FIG. 6B, because "World Computer System" and "WORLD COMPUTER SYSTEM" have different capitalization, when an embodiment of the present invention looks up the expansion "WORLD COMPUTER SYSTEM," it is not found in the Temporary Hash Table shown in FIG. 6A. Thus, the embodiment of the present invention adds the entry for "WORLD COMPUTER SYSTEM" to the Temporary Hash Table. As seen in FIG. 6B, the Temporary Hash Table now includes both terms. Because the term "WORLD COMPUTER SYSTEM" was located in a blog, it receives a weighted score of 0.5 and the Temporary Hash Table seen in FIG. 6B has two expansions and two scores.

As shown in FIG. 6C, the expansion "World Computer System," associated with Idx 3 of FIG. 5, was found in a blog.

As such, it receives a weighted score of 0.5. Because the expansion "World Computer System" is already located in the first row of the Temporary Hash Table seen in FIG. 6B, the 0.5 weighted score is added to the existing score of 1.25. Thus, as seen in FIG. 6C, "World Computer System" has a score of 1.75 and "WORLD COMPUTER SYSTEM" has a score of 0.5.

FIGS. 6D and 6E show an embodiment of the present invention processing the remaining two expansions: "world computer system" [FIG. 6D] and "World Computer System" [FIG. 6E].

FIG. 6E shows that the final score for the expansions are 3.00 for "World Computer System," 0.5 for "WORLD COMPUTER SYSTEM" and 0.5 for "world computer system."

As seen in FIG. 3, an embodiment of the present invention may scan the Temporary Hash Table [FIG. 6E] for the highest score (305 of FIG. 3). An embodiment of the present invention then identifies the highest scoring expansion as the most likely expansion of the acronym "WCS." Because the expansions have been weighted, the embodiments of the present invention are also likely to produce the correct capitalization of the acronym of interest. Because the highest scoring expansion is "World Computer System," the embodiment of the present invention identifies "World Computer System" as the most likely expansion of the acronym of interest. The information may be communicated to the user or stored for later retrieval. In another embodiment, the information may be used by an application to report acronym expansions within an electronic text to a user.

Exemplary Computer Architecture for
Implementation of Systems and Methods

Figure 7:
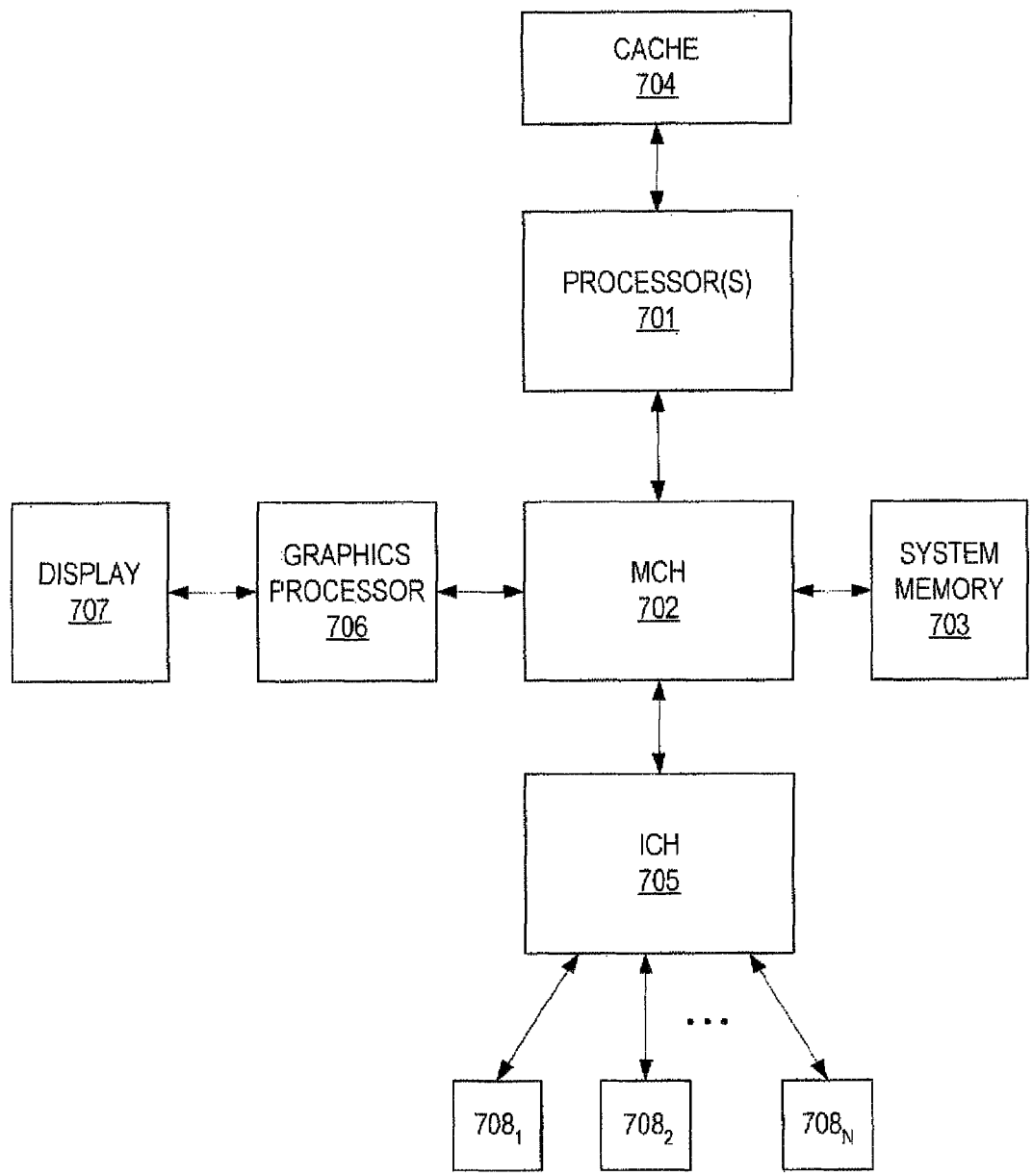
FIG. 7 is an example of computer architecture for implementing the embodiments as illustrated in FIGS. 1-3.

FIG. 7 illustrates an example of computer architecture for implementing as the system and methods illustrated in FIGS. 1-3 and described above. The exemplary computing system of FIG. 7 includes: 1) one or more processors 701; 2) a memory control hub (MCH) 702; 3) a system memory 703 (of which different types exist such as DDR RAM, EDO RAM, etc,); 4) a cache 704; 5) an I/O control hub (ICH) 705; 6) a graphics processor 706; 7) a display/screen 707 (of which different types exist such as Cathode Ray Tube (CRT), Thin Film Transistor (TFT), Liquid Crystal Display (LCD), DPL, etc.); and/or 8) one or more I/O devices 708.

The one or more processors 701 execute instructions in order to perform whatever software routines the computing system implements. The instructions frequently involve some sort of operation performed upon data. Both data and instructions are stored in system memory 703 and cache 704. Cache 704 is typically designed to have shorter latency times than system memory 703. For example, cache 704 might be integrated onto the same silicon chip(s) as the processor(s) and/or constructed with faster SRAM cells whilst system memory 703 might be constructed with slower DRAM cells. By tending to store more frequently used instructions and data in the cache 704 as opposed to the system memory 703, the overall performance efficiency of the computing system improves.

System memory 703 is deliberately made available to other components within the computing system. For example, the data received from various interfaces to the computing system (e.g., keyboard and mouse, printer port, LAN port, modem port, etc.) or retrieved from an internal storage element of the computing system (e.g., hard disk drive) are often temporarily queued into system memory 703 prior to their being operated upon by the one or more processor(s) 701 in the implementation of a software program. Similarly, data that a software program determines should be sent from the computing system to an outside entity through one of the computing system interfaces, or stored into an internal storage element, is often temporarily queued in system memory 703 prior to its being transmitted or stored.

The ICH 705 is responsible for ensuring that such data is properly passed between the system memory 703 and its appropriate corresponding computing system interface (and internal storage device if the computing system is so designed). The MCH 702 is responsible for managing the various contending requests for system memory 703 access amongst the processor(s) 701, interfaces and internal storage elements that may proximately arise in time with respect to one another.

One or more I/O devices 708 are also implemented in a typical computing system. I/O devices generally are responsible for transferring data to and/or from the computing system (e.g., a networking adapter); or, for large-scale non-volatile storage within the computing system (e.g., hard disk drive). ICH 705 has bi-directional point-to-point links between itself and the observed I/O devices 708.

Referring back to FIGS. 1-6, modules of the different embodiments of the described system may include software, hardware, firmware, or any combination thereof. The modules may be software programs available to the public or special or general-purpose processors running proprietary or public software. The software may also be specialized programs written specifically for signature creation and organization and recompilation management. For example, storage of the system may include, but is not limited to, hardware (such as floppy diskettes, optical disks, CD-ROMs, and magneto-optical disks, ROMs, RAMs, EPROMs, EEPROMs, flash, magnetic or optical cards, propagation media or other type of media/machine-readable medium), software (such as instructions to require storage of information on a hardware storage unit, or any combination thereof.

In addition, elements of the present invention may also be provided as a machine-readable medium for storing the machine-executable instructions. The machine-readable medium may include, but is not limited to, floppy diskettes, optical disks, CD-ROMs, and magneto-optical disks, ROMs, RAMs, EPROMs, EEPROMs, flash, magnetic or optical cards, propagation media or other type of media/machine-readable medium suitable for storing electronic instructions.

For the exemplary methods illustrated in FIGS. 1 and 3, embodiments of the invention may include the various processes as set forth above. The processes may be embodied in machine-executable instructions which cause a general-purpose or special-purpose processor to perform certain steps. Alternatively, these processes may be performed by specific hardware components that contain hardwired logic for performing the processes, or by any combination of programmed computer components and custom hardware components.

For the exemplary system illustrated in FIG. 2, embodiments of the invention may include the various modules as set forth. Each module may be implemented in hardware, software, firmware, or a combination thereof. The modules may be connected in different order and/or connect to other modules. Not all modules may be needed, or other modules may be included in implementing embodiments of the invention.

Embodiments of the invention do not require all of the various processes presented, and it may be conceived by one skilled in the art as to how to practice the embodiments of the invention without specific processes presented or with extra processes not presented.

General

The foregoing description of the embodiments of the invention has been presented only for the purpose of illustration and description and is not intended to be exhaustive or to limit the invention to the precise forms disclosed. Numerous modifications and adaptations are apparent to those skilled in the art without departing from the spirit and scope of the invention.

What is claimed is:

1. A computer-implemented method for organizing a plurality of identified expansions for a potential acronym, wherein each identified expansion is derived from a text source from a text source location, comprising:

creating from the plurality of identified expansions a case-insensitive group of identified expansions, wherein each identified expansion of the case-insensitive group match in a case-insensitive manner the other identified expansions of the case-insensitive group;

assigning a weight to the text source location for each identified expansion in the case-insensitive group;

creating from the case-insensitive group at least one case-sensitive group of identified expansions, wherein each identified expansion of the case-sensitive group of identified expansions match in a case-sensitive manner the other identified expansions of the group of case-sensitive identified expansions;

for each case-sensitive group of identified expansions, determining from the weights of the text source locations for the identified expansions a total weight;

comparing the total weights for the at least one group of case-sensitive identified expansions;

selecting a first group of case-sensitive identified expansions from the at least one group of case-sensitive identified expansions upon comparing the total weights; and associating an identified expansion corresponding to the first case-sensitive group of identified expansions to the potential acronym.

2. The method of claim 1, further comprising:

storing the association between the identified expansion and the potential acronym for later retrieval;

retrieving the association upon receiving a query for the expansion to the acronym; and determining and communicating the identified expansion to the user.

3. The method of claim 1, wherein the weight assigned to the text source location is dependent on at least one of the group consisting of:

the type of text source; and
the text source location.

4. The method of claim 1, wherein the identified expansions are determined from an electronic text for each acronym of a plurality of acronyms in the electronic text, wherein determining the identified expansions comprises:

receiving a text source from a text source location;

tokenizing text from the text source to create a token for each word in the text;

corresponding the order of the tokens to the order of text from the text source;

identifying at least one potential acronym in the tokens;

for the at least one potential acronym, creating a window of tokens comprising tokens less than a predetermined number of tokens occurring before and/or after the potential acronym; and identifying from the window the expansion for the at least one potential acronym, comprising:

for a first unmatched letter of the potential acronym:

determining a first token in the window with a first letter of the first token matching the first unmatched letter of the potential acronym;

determining if a first letter of the tokens subsequent and sequential to the first token match the letters subsequent and sequential to the first unmatched letter of the potential acronym;

if the first letter of the tokens subsequent and sequential to the first token does not match the letters subsequent and sequential to the first unmatched letter of the potential acronym:

determining if the first unmatched letter and the letters subsequent and sequential to the first unmatched letter of the potential acronym match the acronym letters associated with a predefined word in a preexisting acronym-word connection list; and if the first unmatched letter and the letters subsequent and sequential to the first unmatched letter of the potential acronym match the acronym letters associated with a predefined word in the preexisting acronym-word connection list, determining if the predefined word exists as a token in the window; and if the first letter of the tokens subsequent and sequential to the first token does not match the letters subsequent and sequential to the first unmatched letter of the potential acronym, determining if at least one letter subsequent and sequential to the first letter of the first token match at least one letter subsequent and sequential to the first unmatched letter of the potential acronym; and upon matching the first unmatched letter of the potential acronym with a token in the window, determining that the first unmatched letter is a matched letter.

5. The computer-implemented method of claim 4, further comprising for an unmatched letter 'x' of the potential acronym, determining a token wherein a second letter of the token is 'x'.

6. The computer-implemented method of claim 4, further comprising for an unmatched letter subsequent to a letter of the potential acronym matched to a first token in the window, determining if the unmatched letter matches the first letter of a second token subsequent to the first token, wherein at least one intermediate token is between the first token and second token.

7. The computer-implemented method of claim 4, wherein identifying from the window the expansion for the at least one potential acronym is from either before the potential acronym or after the potential acronym.

8. A system for determining the most likely expansion of an acronym, wherein each identified expansion of the acronym is derived from a text source from a text source location, comprising:

a module configured to create from the plurality of identified expansions a case-insensitive group of identified expansions, wherein each identified expansion of the case-insensitive group match in a case-insensitive manner the other identified expansions of the case-insensitive group;

a module configured to assign a weight to the text source location for each identified expansion in the case-insensitive group;

a module configured to create from the case-insensitive group at least one case-sensitive group of identified expansions, wherein each identified expansion of the case-sensitive group of identified expansions match in a case-sensitive manner the other identified expansions of the group of case-sensitive identified expansions;

a module configured to, for each case-sensitive group of identified expansions, determine from the weights of the text source locations for the identified expansions a total weight;

a module configured to compare the total weights for the at least one group of case-sensitive identified expansions;

a module configured to select a first group of case-sensitive identified expansions from the at least one group of case-sensitive identified expansions upon comparing the total weights; and a module configured to associate an identified expansion corresponding to the first case-sensitive group of identified expansions to the potential acronym.

9. The system of claim 8 further comprising a module configured to store the association between the identified expansion and the potential acronym for later retrieval, wherein a the system retrieves the association upon receiving a query from a user to identify the potential acronym and uses the association to communicate the identified expansion to the user.

10. The system of claim 8, wherein the weight assigned to the text source location is dependent on at least one of the group consisting of:
   the type of text source; and
   the text source location.

11. The system of claim 8, further comprising a system to determine the identified expansions from an electronic text for each acronym of a plurality of acronyms in the electronic text, the system to determine the identified expansions comprising:
   a module configured to receive a text source from a text source location;
   a module configured to tokenize text from the text source to create a token for each word in the text;
   a module configured to correspond the order of the tokens to the order of text from the text source;
   a module configured to identify at least one potential acronym in the tokens;
   a module configured to, for the at least one potential acronym, create a window of tokens comprising tokens less than a predetermined number of tokens occurring before and/or after the potential acronym; and
   a module configured to identify from the window the expansion for the at least one potential acronym, comprising:
      for a first unmatched letter of the potential acronym:
         determining a first token in the window with a first letter of the first token matching the first unmatched letter of the potential acronym;
         determining if a first letter of the tokens subsequent and sequential to the first token match the letters subsequent and sequential to the first unmatched letter of the potential acronym;
         if the first letter of the tokens subsequent and sequential to the first token does not match the letters subsequent and sequential to the first unmatched letter of the potential acronym:
            determining if the first unmatched letter and the letters subsequent and sequential to the first unmatched letter of the potential acronym match the acronym letters associated with a predefined word in a preexisting acronym-word connection list; and
            if the first unmatched letter and the letters subsequent and sequential to the first unmatched letter of the potential acronym match the acronym letters associated with a predefined word in the preexisting acronym-word connection list, determining if the predefined word exists as a token in the window; and
            if the first letter of the tokens subsequent and sequential to the first token does not match the letters subsequent and sequential to the first unmatched letter of the potential acronym, determining if at least one letter subsequent and sequential to the first letter of the first token match at least one letter subsequent and sequential to the first unmatched letter of the potential acronym; and
      upon matching the first unmatched letter of the potential acronym with a token in the window, determining that the first unmatched letter is a matched letter.

12. The system of claim 11, wherein the module configured to identify from the window the expansion for the at least one potential acronym is further configured to, for an unmatched letter 'x' of the potential acronym, determine a token wherein a second letter of the token is 'x'.

13. The system of claim 11, wherein the module configured to identify from the window the expansion for the at least one potential acronym is further configured to, for an unmatched letter subsequent to a letter of the potential acronym matched to a first token in the window, determine if the unmatched letter matches the first letter of a second token subsequent to the first token, wherein at least one intermediate token is between the first token and second token.

14. The system of claim 11, wherein the module configured to identify from the window the expansion for the at least one potential acronym is further configured to identify the expansion from either before the potential acronym or after the potential acronym in the window.

15. A computer program product comprising a computer useable storage medium to store a computer readable program, wherein the computer readable program, when executed on a computer, causes the computer to perform operations comprising:
   creating from the plurality of identified expansions a case-insensitive group of identified expansions, wherein each identified expansion of the case-insensitive group match in a case-insensitive manner the other identified expansions of the case-insensitive group;
   assigning a weight to the text source location for each identified expansion in the case-insensitive group;
   creating from the case-insensitive group at least one case-sensitive group of identified expansions, wherein each identified expansion of the case-sensitive group of identified expansions match in a case-sensitive manner the other identified expansions of the group of case-sensitive identified expansions;
   for each case-sensitive group of identified expansions, determining from the weights of the text source locations for the identified expansions a total weight;
   comparing the total weights for the at least one group of case-sensitive identified expansions;
   selecting a first group of case-sensitive identified expansions from the at least one group of case-sensitive identified expansions upon comparing the total weights; and
   associating an identified expansion corresponding to the first case-sensitive group of identified expansions to the potential acronym.

16. The computer program product of claim 15, wherein the operations further comprise:
   storing the association between the identified expansion and the potential acronym for later retrieval;
   retrieving the association upon receiving a query for the expansion to the acronym; and determining and communicating the identified expansion to the user.

17. The computer program product of claim 15, wherein the weight assigned to the text source location is dependent on at least one of the group consisting of:
 the type of text source; and
 the text source location.

18. The computer program product of claim 15, wherein the operations further comprise determining identified expansions from an electronic text for each acronym of a plurality of acronyms in the electronic text, wherein determining the identified expansions comprises:
 receiving a text source from a text source location;
 tokenizing text from the text source to create a token for each word in the text;
 corresponding the order of the tokens to the order of text from the text source;
 identifying at least one potential acronym in the tokens;
 for the at least one potential acronym, creating a window of tokens comprising tokens less than a predetermined number of tokens occurring before and/or after the potential acronym; and
 identifying from the window the expansion for the at least one potential acronym, comprising:
  for a first unmatched letter of the potential acronym:
   determining a first token in the window with a first letter of the first token matching the first unmatched letter of the potential acronym;
   determining if a first letter of the tokens subsequent and sequential to the first token match the letters subsequent and sequential to the first unmatched letter of the potential acronym;
   if the first letter of the tokens subsequent and sequential to the first token does not match the letters subsequent and sequential to the first unmatched letter of the potential acronym:
    determining if the first unmatched letter and the letters subsequent and sequential to the first unmatched letter of the potential acronym match the acronym letters associated with a predefined word in a preexisting acronym-word connection list; and
    if the first unmatched letter and the letters subsequent and sequential to the first unmatched letter of the potential acronym match the acronym letters associated with a predefined word in the preexisting acronym-word connection list, determining if the predefined word exists as a token in the window; and
   if the first letter of the tokens subsequent and sequential to the first token does not match the letters subsequent and sequential to the first unmatched letter of the potential acronym, determining if at least one letter subsequent and sequential to the first letter of the first token match at least one letter subsequent and sequential to the first unmatched letter of the potential acronym; and
  upon matching the first unmatched letter of the potential acronym with a token in the window, determining that the first unmatched letter is a matched letter.

19. The computer program product of claim 18, wherein determining from the window the expansion further comprises, for an unmatched letter 'x' of the potential acronym, determining a token wherein a second letter of the token is 'x'.

20. The computer program product of claim 18, wherein determining from the window the expansion further comprises, for an unmatched letter subsequent to a letter of the potential acronym matched to a first token in the window, determining if the unmatched letter matches the first letter of a second token subsequent to the first token, wherein at least one intermediate token is between the first token and second token.

\* \* \* \* \*